US011625029B2

(12) United States Patent
Takahashi et al.

(10) Patent No.: US 11,625,029 B2
(45) Date of Patent: Apr. 11, 2023

(54) MANUFACTURING CONDITION SETTING AUTOMATING APPARATUS AND METHOD

(71) Applicant: HITACHI, LTD., Tokyo (JP)

(72) Inventors: Masakazu Takahashi, Tokyo (JP); Takuro Yasui, Tokyo (JP); Keiro Muro, Tokyo (JP)

(73) Assignee: HITACHI, LTD., Tokyo (JP)

( * ) Notice: Subject to any disclaimer, the term of this patent is extended or adjusted under 35 U.S.C. 154(b) by 81 days.

(21) Appl. No.: 17/179,009

(22) Filed: Feb. 18, 2021

(65) Prior Publication Data

US 2022/0066429 A1 Mar. 3, 2022

(30) Foreign Application Priority Data

Aug. 31, 2020 (JP) .............................. JP2020-145942

(51) Int. Cl.
*G05B 19/418* (2006.01)
*G06F 16/2455* (2019.01)

(52) U.S. Cl.
CPC ... *G05B 19/41875* (2013.01); *G06F 16/2455* (2019.01); *G05B 2219/32368* (2013.01)

(58) Field of Classification Search
None
See application file for complete search history.

(56) References Cited

U.S. PATENT DOCUMENTS

| | | | | |
|---|---|---|---|---|
| 7,577,486 B2* | 8/2009 | Toyofuku | ............... | G06Q 10/10 707/999.102 |
| 8,343,305 B2* | 1/2013 | Patrick | ................... | G01N 17/04 156/345.23 |
| 8,370,181 B2* | 2/2013 | Shah-Hosseini | ....... | G06Q 10/06 705/7.29 |
| 9,324,588 B2* | 4/2016 | Asakura | .............. | H01J 37/3244 |
| 10,265,911 B1* | 4/2019 | Capri | ............... | G05B 19/41875 |
| 2002/0123816 A1* | 9/2002 | Tanaka | .................. | G05B 21/02 700/121 |

(Continued)

FOREIGN PATENT DOCUMENTS

JP 2019-168796 A 10/2019

*Primary Examiner* — Jason Lin
(74) *Attorney, Agent, or Firm* — Volpe Koenig

(57) ABSTRACT

A manufacturing condition setting automating apparatus includes: a quality judging unit that computes a present process quality from facility data at predetermined time intervals, and judges whether or not it is in a quality tolerance range; a manufacturing condition candidate creating unit that computes a feature quantity, searches a database for condition change cases having similar feature quantities, tabulates condition change cases basis on whether the condition change cases are successes or failures, and outputs manufacturing condition candidates in descending order of rates of successes; an imbalance-preventing manufacturing condition candidate creating unit that changes scores that decide ranks of manufacturing condition candidates, and creates a ranking of manufacturing condition candidates; and a manufacturing condition output unit that outputs a set value of a condition change of a top manufacturing condition candidate to the manufacturing facility, and registers a new condition change in the condition change history.

10 Claims, 15 Drawing Sheets

(56) References Cited

U.S. PATENT DOCUMENTS

| | | | | |
|---|---|---|---|---|
| 2007/0162172 A1* | 7/2007 | Tanaka | ............... | G05B 23/0221 |
| | | | | 700/108 |
| 2009/0171476 A1* | 7/2009 | Aloni | ............... | G05B 19/41875 |
| | | | | 700/266 |
| 2016/0059412 A1* | 3/2016 | Oleynik | ............... | B62D 57/032 |
| | | | | 700/250 |
| 2019/0121348 A1* | 4/2019 | Celia | ....................... | G06N 20/00 |
| 2019/0221407 A1* | 7/2019 | Umeda | ............. | H01J 37/32926 |
| 2020/0333777 A1* | 10/2020 | Maruyama | ............. | G06N 20/10 |

* cited by examiner

MANUFACTURING MANAGEMENT DATA  121

| ID | MANUFAC-TURING START TIME | SCHEDULED MANUFAC-TURING END TIME | MANUFAC-TURING AMOUNT TARGET | YIELD TARGET | PRODUCTION SPEED TARGET | MANUFAC-TURING AMOUNT ACHIEVEMENT | YIELD ACHIEVE-MENT | PRODUCTION SPEED ACHIEVEMENT |
|---|---|---|---|---|---|---|---|---|
| 1 | 3/1 9:00 | 3/1 17:00 | 1000 | 99% | 120/hr | 1000 | 98% | 120/hr |
| 2 | 3/2 9:00 | 3/2 15:00 | 500 | 98% | 100/hr | 100 | 100% | 110/hr |
| 3 | 3/3 9:00 | 3/4 9:00 | 2000 | 95% | 80/hr | 0 | -- | -- |

FIG. 5

FEATURE QUANTITY SETTINGS 122

| ID | TYPE | FEATURE QUANTITY NAME | USE PARAMETER | PERIOD | COMPUTATION FORMULA | LOWER LIMIT | UPPER LIMIT |
|---|---|---|---|---|---|---|---|
| 1 | QUALITY | QUALITY Q | q | 10 min | (USL-LSL)/6*Std(q) | 1.33 | - |
| 2 | SIMILARITY | FEATURE QUANTITY A | a | 10 min | mean(a) | 9 | 18 |
| 3 | SIMILARITY | FEATURE QUANTITY B | b | 10 min | mean(b) | 41 | 70 |
| 4 | SIMILARITY | FEATURE QUANTITY Q | q | 10 min | mean(q) | -5.0 | +5.0 |
| 5 | SETTINGS | SET VALUE S | s | - | s | - | - |

USL: UPPER LIMIT STANDARD VALUE
LSL: LOWER LIMIT STANDARD VALUE

FIG. 6

MANUFACTURING CONDITION SETTINGS 123

| ID | MANUFACTURING CONDITION | LOWER LIMIT | UPPER LIMIT |
|---|---|---|---|
| 1 | SET VALUE S | 1.9 | 2.9 |
| 2 | SET VALUE MINIMUM UNIT | 0.1 | 0.1 |
| 3 | SETTING VALUE CHANGE WIDTH ΔS | -0.5 | +0.5 |
| 4 | SCORE | 50 | 100 |

FIG. 7

CONDITION CHANGE HISTORY 124

| ID | TIME | CHANGE TARGET MANUFAC- TURING CONDITION | MANUFAC- TURING CONDITION BEFORE CHANGE | MANUFAC- TURING CONDITION AFTER CHANGE | QUALITY Q BEFORE CHANGE | QUALITY Q AFTER CHANGE | FEATURE QUANTITY A BEFORE CHANGE | FEATURE QUANTITY B BEFORE CHANGE | FEATURE QUANTITY Q BEFORE CHANGE | ... | SUCCESS OR FAILURE |
|---|---|---|---|---|---|---|---|---|---|---|---|
| 1 | 2/1 9:18 | SET VALUE S | 2.1 | 2.4 | 1.20 | 1.40 | 10 | 56 | -2.8 | ... | ○ |
| 2 | 2/3 7:51 | SET VALUE S | 2.8 | 2.6 | 1.38 | 1.34 | 12 | 46 | 3.4 | ... | × |
| 3 | 2/4 2:44 | SET VALUE S | 2.5 | 2.4 | 1.29 | 1.36 | 15 | 51 | 1.6 | ... | ○ |
| 4 | 2/5 10:01 | SET VALUE S | 2.0 | 2.3 | 1.37 | 1.33 | 11 | 67 | 2.5 | ... | × |
| 5 | 2/7 15:05 | SET VALUE S | 2.7 | 2.5 | 1.30 | 1.28 | 10 | 62 | -0.7 | ... | × |

○: SUCCESS
×: FAILURE

FIG. 8

FACILITY DATA  125

| ID | TIME | s | q | a | b | .... |
|---|---|---|---|---|---|---|
| 1 | 3/1 9:18:00 | 2.1 | 1.21 | 10 | 55 | .... |
| 2 | 3/1 9:18:01 | 2.1 | 1.22 | 10 | 56 | .... |
| 3 | 3/1 9:18:02 | 2.1 | 1.21 | 11 | 56 | .... |
| 4 | 3/1 9:18:03 | 2.1 | 1.21 | 10 | 55 | .... |
| 5 | 3/1 9:18:04 | 2.1 | 1.23 | 10 | 57 | .... |

FIG. 9

MANUFACTURING CONDITION CANDIDATE
@MANUFACTURING CONDITION CANDIDATE  126
CREATING UNIT

| RANK | SET VALUES | SUCCESSFUL CASE | FAILED CASE | RATE OF SUCCESSES (SCORE) | AVERAGE OF QUALITY Q AFTER CONDITION CHANGE OF SUCCESSFUL CASES |
|---|---|---|---|---|---|
| 1 | 2.5 | 8 | 2 | 80% | 1.2 |
| 2 | 2.3 | 3 | 2 | 60% | 1.3 |
| 3 | 2.8 | 1 | 1 | 50% | 1.5 |
| 4 | 1.9 | 0 | 1 | 0% | — |

FIG. 10

MANUFACTURING CONDITION CANDIDATE
@IMBALANCE-PREVENTING MANUFACTURING  126
CONDITION CANDIDATE CREATING UNIT

| RANK | SET VALUES | SUCCESSFUL CASE | FAILED CASE | RATE OF SUCCESSES | AVERAGE OF QUALITY Q AFTER CONDITION CHANGE OF SUCCESSFUL CASES |
|---|---|---|---|---|---|
| 0 | 2.5 | 8 | 2 | 80% | 1.2 |
| 1 | 2.8 | 1 | 1 | 50% | 1.5 |
| 2 | 1.9 | 0 | 1 | 0% | — |
| 3 | 2.3 | 3 | 2 | 60% | 1.3 |

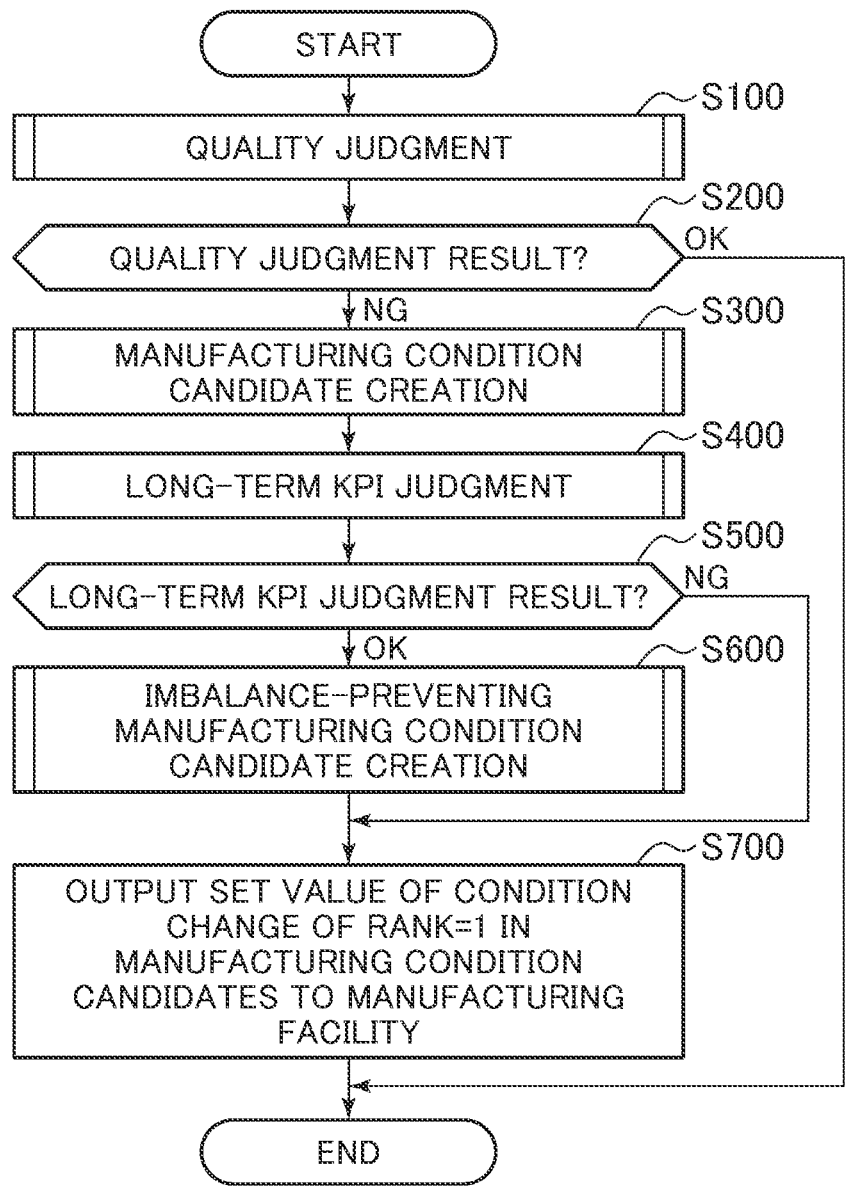

MANUFACTURING CONDITION SETTING AUTOMATING APPARATUS AND METHOD

BACKGROUND

The present invention relates to a manufacturing condition setting automating apparatus, and method.

Use of information technology in the manufacturing industry has been accelerated globally due to the enhancement of the sensing technology, and computing capacity. Actually, efforts have been made more widely to enhance sales, and productivity by analyzing various types of data related to products, facilities, operators, and the like.

One of use examples of information technology in the manufacturing industry is decisions of optimum manufacturing conditions. Manufacturing conditions include conditions that are decided at the step of product designing, and conditions that are changed as countermeasures against quality deterioration of products being manufactured. Regarding the latter countermeasures, typically, every piece of data acquired at the time of manufacturing related to products, facilities, operators, and the like is analyzed to discover causes of quality deterioration, and it is determined which countermeasures are effective to implement.

Japanese Unexamined Patent Application Publication No. 2019-168796 discloses a technology for providing a feature selecting apparatus. In a circumstance where it has become difficult for clients to determine the precision of an incident judgment model in a SOC (Security Operation Center) service, the feature selecting apparatus can assist examination of changes to be made about features in the incident analysis judgment model in accordance with environmental variations.

Japanese Unexamined Patent Application Publication No. 2019-168796 describes that the feature selecting apparatus includes an evaluation value computing unit that computes an evaluation value of a new feature to be a candidate to be added to the incident judgment model. The evaluation value computing unit computes: the similarity between the new feature, and a current feature which is a current feature of the incident judgment model, and is similar to the new feature; the similarity between the new feature, and a related trend feature which is a feature of a cyberattack that is prevalent in the field of information security, and is similar to the new feature; and the similarity between the related trend feature, and client characteristics representing characteristics of a client, and by using the similarity between the new feature and the similar current feature, the similarity between the new feature and the related trend feature, and the degree of agreement between the related trend feature and the client characteristics, the evaluation value computing unit computes an evaluation value of the new feature.

SUMMARY

According to the technology disclosed in Japanese Unexamined Patent Application Publication No. 2019-168796, in a case that the analysis by the apparatus is used for automating changes to be made about manufacturing conditions for a manufacturing facility, only the most implemented condition change is executed under the same conditions. Accordingly, an imbalance occurs in condition change history data to serve as training data, and the quality of data (diversity) that can be used at the time of model update or at the time of re-analysis deteriorates.

The present invention has been made in view of the problem described above, and an object thereof is to provide a manufacturing condition setting automating apparatus, and method that can:

(1) keep the diversity of training data (condition change history data), and enhance the precision at the time of model update, and at the time of additional analysis; and (2) retain, as a condition change candidate, even condition change history data that is generated in a case that a manufacturing condition change has resulted in a failure due to an external factor, and avoid a situation where condition changes cannot be made in the future.

A preferred example of a manufacturing condition setting automating apparatus of the present invention includes: a facility data acquiring unit that always collects a plurality of pieces of facility data from a manufacturing facility in manufacturing operation, and records the plurality of pieces of facility data in a database; a quality judging unit that computes a present process capability (quality) from facility data of a target manufacturing facility at predetermined time intervals, and judges whether or not the present process capability is in a quality tolerance range; a manufacturing condition candidate creating unit that, in a case that the present process capability is judged as being not in the quality tolerance range, computes a feature quantity to be used for a similarity judgment from latest facility data, searches a database of a past condition change history for condition change cases having similar feature quantities, tabulates condition change cases found through the search on a basis of whether the condition change cases are successes or failures, and outputs manufacturing condition candidates in descending order of rates of successes; an imbalance-preventing manufacturing condition candidate creating unit that, in a case that a present long-term KPI is judged as being higher than a target value, changes scores that decide ranks of manufacturing condition candidates, and creates manufacturing condition candidates in which condition change candidates with fewest failed cases are ranked higher, except for a condition change candidate having a highest rate of successes; and a manufacturing condition output unit that outputs a set value of a condition change of a top manufacturing condition candidate to the manufacturing facility, and registers a new condition change in the condition change history.

According to the present invention, it becomes possible to realize a manufacturing condition setting automating apparatus, and method that can: keep the diversity of training data (condition change history data), and enhance the precision at the time of model update, and at the time of additional analysis; and retain, as a condition change candidate, even condition change history data that is generated in a case that a manufacturing condition change has resulted in a failure due to an external factor, and avoid a situation where condition changes cannot be made in the future.

BRIEF DESCRIPTION OF THE DRAWINGS

FIG. 5 is a figure depicting one example of a data table of feature quantity settings in the first embodiment.

FIG. 6 is a figure depicting one example of a data table of manufacturing condition settings in the first embodiment.

FIG. 7 is a figure depicting one example of a database of a condition change history in the first embodiment.

FIG. 8 is a figure depicting one example of a database of facility data in the first embodiment.

FIG. 9 is a figure depicting one example of a data table of manufacturing condition candidates created by a manufacturing condition candidate creating unit in the first embodiment.

FIG. 10 is a figure depicting one example of a data table of manufacturing condition candidates having been subjected to a process at an imbalance-preventing manufacturing condition candidate creating unit in the first embodiment.

FIG. 11 is a figure depicting one example of imbalance-preventing candidate creation settings in the first embodiment.

FIG. 12 is one example of a flowchart depicting a manufacturing condition setting process performed by a manufacturing condition setting unit of the manufacturing condition setting automating apparatus in the first embodiment.

DETAILED DESCRIPTION

Figure 1:
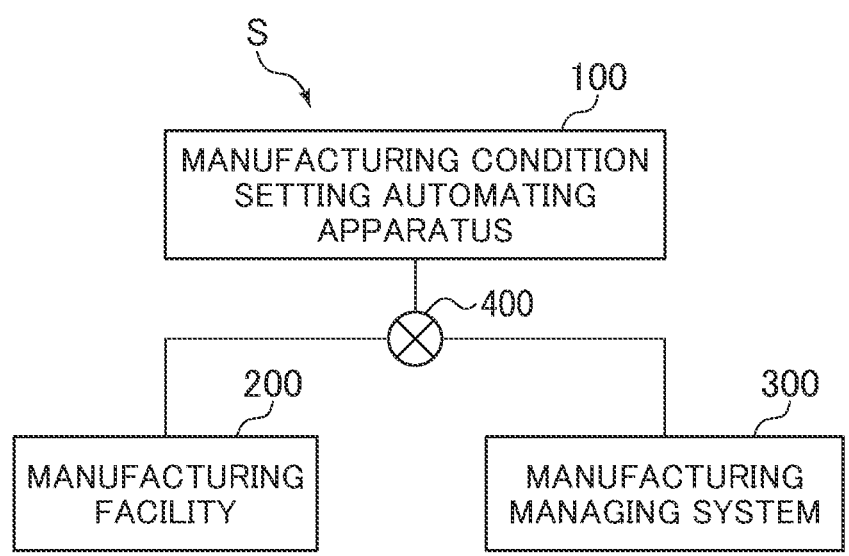
FIG. 1 is a configuration diagram depicting a manufacturing system according to a first embodiment.

Before embodiments of a manufacturing condition setting automating apparatus, and method of the present invention are described, matters examined by the inventors of the present invention are explained.

As a system to promote use of IoT data at manufacturing sites, and avoidance of the dependence on particular people for countermeasures for enhancement of quality, welding processes of automobile parts manufacturing were examined as a target, for example.

It is assumed that facility data such as values of voltage applied to a processing unit when predetermined portions of products are to be welded, differences in the thicknesses of the products before and after the welding (hereinafter, the values of the differences are referred to as "change amounts"), or values of current supplied to the processing unit is collected for each product at all times from an automatic welding machine installed in a target process, and recorded in a database.

From this facility database, facility data of a predetermined number of latest consecutive products or within a predetermined length of a preceding time range is read out at predetermined time intervals, the process capability (index) representing a capability about the quality of a process is computed, for example, and it is judged whether or not the quality of the target process has deteriorated. The devised system implements countermeasures of changing a manufacturing condition (the set value of a voltage), and setting the manufacturing condition for the welding machine, for example, on the basis of the past condition change history in a case that it is judged that the quality has become deteriorated as compared to a predetermined threshold.

For each target process (welding machine), the past condition change history has records including: records representing how the manufacturing condition (the set value of a voltage) differs between before changes and after the changes; times of the condition changes; various types of feature quantity (e.g. the average value of the voltage, the average of change amounts, the standard deviation of the change amounts, the average of electric current values, etc.) before the changes and after the changes representing effects of the condition changes that are computed from the facility data; and the process capability before and after the manufacturing condition changes.

When being referred to, information of each manufacturing condition change setting recorded in the past condition change history is evaluated as a successful case of a manufacturing condition change setting process in a case that the process capability after the change has become higher than the process capability before the change due to the manufacturing condition change setting, and is evaluated as a failed case of a manufacturing condition change setting process in a case that the process capability after the change has not become higher than the process capability before the change due to the manufacturing condition change setting.

In this manner, data of several months or one year, for example, is recorded in a database, as the past condition change history, and as training data.

As described above, while the target process (welding machine) is executing normal manufacturing, the manufacturing condition setting automating apparatus is activated at predetermined time intervals, and reads out facility data of a predetermined number of latest consecutive products or in a predetermined length of a preceding time range. In a case that it is judged that the process capability (index) has deteriorated, the manufacturing condition setting automating apparatus performs a condition change on the manufacturing condition (the set value of the voltage) of the applicable target process (welding machine) on the basis of the past condition change history.

In the condition change method, similarity-search feature quantities selected for a similarity search in the various types of feature quantity are computed from the facility data having been read out, and each similarity-search feature quantity is given an error for a search (±threshold), and a database of a past condition change history is searched for past condition change data having feature quantities all of which match the similarity-search feature quantities with errors that are within error ranges.

Then, the process capabilities, before a manufacturing condition change and after the change, of each piece of the past condition change data found through the search are compared, and it is judged where the condition change is a successful case or a failed case (the result of the judgment about a success or failure of the condition change is recorded at the time of the first search).

Each piece of the past condition change data found through the search is classified for each set value after a change of the manufacturing condition (the set value of the voltage), and the number of successful cases, and the number of failed cases for each set value after changes of the manufacturing condition (the set value of the voltage) are computed.

Then, the set value after a change of a manufacturing condition (the set value of the voltage) with the highest rate of successes=(number of successful cases)/((number of successful cases)+(number of failed cases)) is judged as a change candidate of the manufacturing condition (the set value of the voltage). After the judgment, the manufacturing condition (the set value of the voltage) of the target process (welding machine) is changed to the set value of the change candidate.

In the condition change method of automatically setting a manufacturing condition (the set value of the voltage) on the basis of a past condition change history (training data) at the time of quality deterioration in the target process as mentioned above, there may be the following problems.

(1) In the method of selecting past condition change data with the highest rate of successes as a change candidate of a manufacturing condition (the set value of the voltage), the set value after the change of the same manufacturing condition (the set value of the voltage) is highly likely selected repeatedly as a change candidate at the subsequent time of condition changes, and even if there is past condition change data that might enhance the process capability after a condition change, the past condition change data will not be selected by the method.

(2) Even if there is past condition change data that has been judged as a failed case due to deterioration of the process capability after a condition change from the process capability before the change, the past condition change data might have been judged as a failed case not because of the condition change, but because of an external factor that cannot be known from IoT data (e.g. factors such as a defect in a product material or a malfunction having occurred to a part of the welding machine or the like). Due to the occurrence of such past condition change data, the set value after a change of a manufacturing condition (the set value of the voltage) that really should have been judged as a change candidate of the manufacturing condition (the set value of the voltage) may not be selected as a candidate. Moreover, if not selected once, it may no longer be set almost at all thereafter.

In view of the problems mentioned above, a manufacturing condition setting automating apparatus, and method into which the following means are incorporated are proposed.

(1) KPIs (yield achievements, production speed achievements, etc.) which are related to a period longer than a sampling period of facility data used for judging the quality (process capability) of a manufacturing apparatus of a target process are introduced. In a case that the KPIs are higher than target values, scores that decide the ranks of manufacturing condition candidates are changed, and manufacturing condition candidates in which condition change candidates with the fewest failed cases are ranked higher, except for the condition change candidate with the highest rate of successes are created.

(2) For each candidate in condition change candidates of a manufacturing condition, new feature quantities are created from all parameters other than feature quantities used for a similarity search, and a feature quantity that allows the most suitable classification into successful cases, and failed cases is identified in the feature quantities. On the basis of a current value of the identified feature quantity, cases of each candidate are filtered, and condition change candidates of the manufacturing condition are created again.

Hereinafter, embodiments of the present invention are explained with reference to drawings. Note that the embodiments explained hereinafter do not limit the invention according to claims, and all of elements, and combinations of the elements explained in the embodiments are not necessarily essential for solutions according to the invention.

First Embodiment

«Schematic Configuration of Manufacturing System»

FIG. 1 is a configuration diagram depicting a manufacturing system according to a first embodiment.

A manufacturing system S according to the present embodiment has a manufacturing condition setting automating apparatus 100, a manufacturing facility 200, and a manufacturing managing system 300. Although one manufacturing facility 200 is depicted in the present embodiment, typically a plurality of types of, and a plurality of manufacturing facilities are connected. The manufacturing condition setting automating apparatus 100 communicates with one or more manufacturing facilities 200 through a communication network 400.

Figure 2:
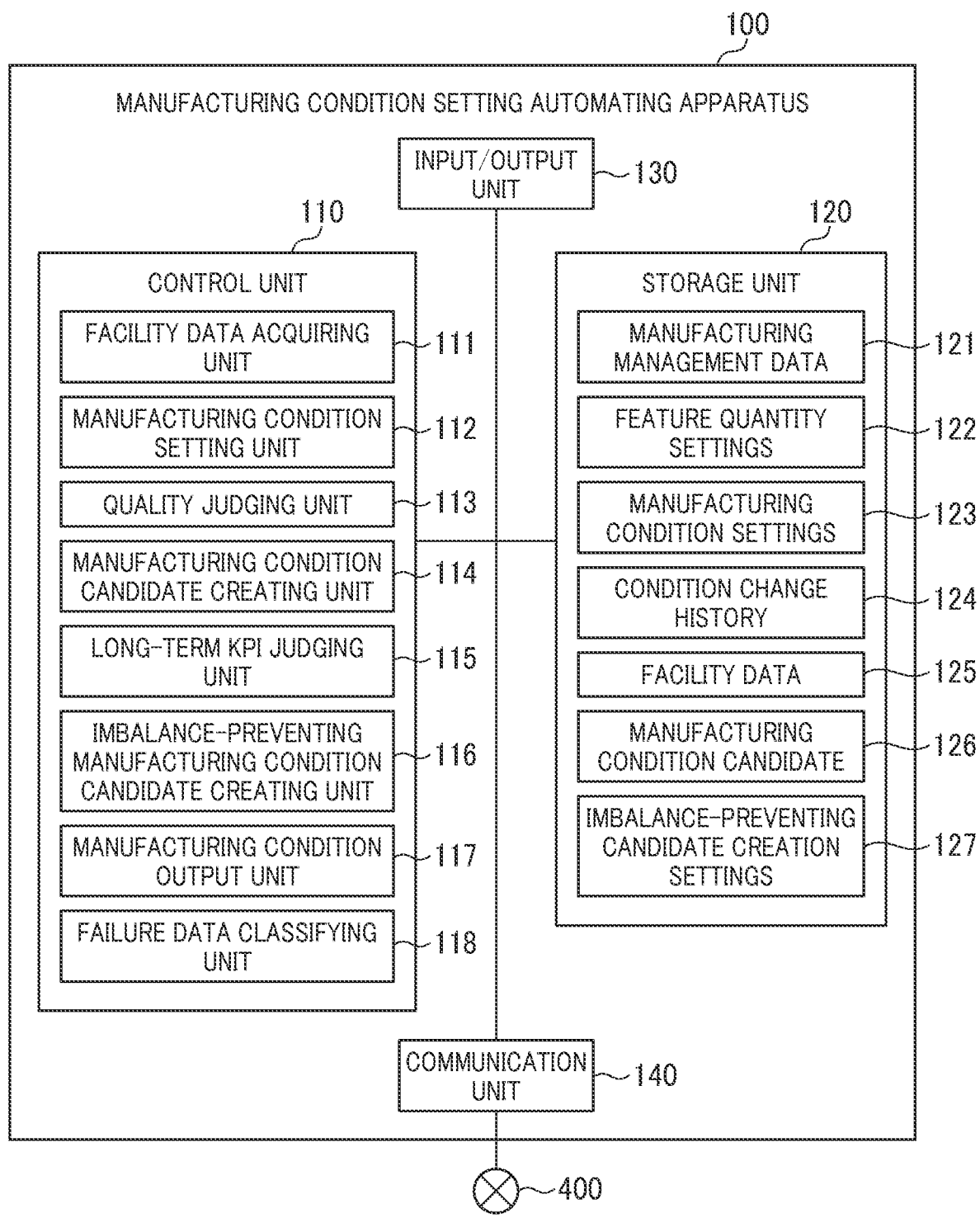
FIG. 2 is a configuration diagram depicting a manufacturing condition setting automating apparatus in the first embodiment.

FIG. 2 is a configuration diagram depicting the manufacturing condition setting automating apparatus 100 in the first embodiment.

The manufacturing condition setting automating apparatus 100 has a control unit 110, a storage unit 120, an input/output unit 130, and a communication unit 140. The manufacturing condition setting automating apparatus 100 preferably includes an apparatus capable of various types of information processing. For example, the manufacturing condition setting automating apparatus 100 includes a computer or the like.

The input/output unit 130 which is one example of an input unit receives input, and output from a user of the manufacturing condition setting automating apparatus 100. The input/output unit 130 includes a combination of input equipment such as a keyboard or a mouse, and output equipment having a display screen such as a liquid crystal display, for example. Alternatively, the input/output unit 130 includes an apparatus like a so-called smartphone or tablet equipment that is capable of input, and output singly.

For example, the input/output unit 130 receives input of information further necessary for creating or changing data recorded in the storage unit 120, and outputs, on a display screen, information representing completion of the creation, and changes, and results of manufacturing condition candidate creation, and setting. An input and output process implemented at the input/output unit 130 may be executed at an input/output unit installed on another apparatus through the communication unit 140.

The control unit 110 executes a program (not depicted) stored on the storage unit 120. The control unit 110 includes a calculation element such as a CPU (Central Processing Unit) that is capable of various types of information processing, for example. For example, the control unit 110 executes processes such as processes of storing data acquired from the input/output unit 130 on the storage unit 120, storing, on the storage unit 120, results of processes on data stored on the storage unit 120, or outputting, to the input/output unit 130 or the communication unit 140, data stored on the storage unit 120.

A program (not depicted) such as firmware is stored on the storage unit 120 mentioned below. When a power supply of the manufacturing condition setting automating apparatus 100 is turned on, the control unit 110 reads in the program stored on the storage unit 120, and executes the program, and performs the overall operation control of the manufacturing condition setting automating apparatus 100. Additionally, the control unit 110 executes the functionality that is depicted about each functional unit mentioned below.

The control unit 110 has a facility data acquiring unit 111, a manufacturing condition setting unit 112, a quality judging unit 113, a manufacturing condition candidate creating unit 114, a long-term KPI judging unit 115, an imbalance-preventing manufacturing condition candidate creating unit 116, and a manufacturing condition output unit 117. In addition, the control unit 110 has a failure data classifying unit 118 in a second embodiment.

The facility data acquiring unit 111 executes a process of always collecting a plurality of pieces of facility data from manufacturing facilities 200 in manufacturing operation, giving an ID to each piece of facility data separately for each manufacturing facility, and storing the plurality of pieces of facility data in facility data 125 in the storage unit 120.

The manufacturing condition setting unit 112 is activated at predetermined time intervals for a target manufacturing facility 200, and judges a present process capability (quality) from facility data of the manufacturing facility. If a quality judgment result is NG, the manufacturing condition setting unit 112 creates a manufacturing condition change candidate. If a long-term KPI judgment result is OK, the manufacturing condition setting unit 112 creates a manufacturing condition candidate for preventing an imbalance of selection of a condition change candidate. The manufacturing condition setting unit 112 outputs a set value of a condition change to the target manufacturing facility.

The quality judging unit 113 computes a current value of the quality (process capability) of the target manufacturing facility from the latest facility data. If the current value satisfies a quality tolerance discriminant, the quality judging unit 113 outputs "OK," and if the current value does not satisfy the quality tolerance discriminant, the quality judging unit 113 outputs "NG."

The manufacturing condition candidate creating unit 114 computes the value of a feature quantity to be used for a similarity judgment from the latest facility data of the target manufacturing facility, searches a database of a past condition change history for condition change cases having similarity-judgment feature quantities that match with errors within a tolerated error range, tabulates the cases found through the search on the basis of success or failure, and outputs manufacturing condition candidates in descending order of rates of successes.

The long-term KPI judging unit 115 compares a yield achievement and a production speed achievement as long-term KPIs individually with target values. If both exceed the targets, long-term KPI judging unit 115 outputs "OK," and if not, the long-term KPI judging unit 115 outputs "NG."

In a case that a result of the judgment about the long-term KPIs is "OK," the imbalance-preventing manufacturing condition candidate creating unit 116 changes scores that decide ranks of manufacturing condition candidates, and creates manufacturing condition candidates in which condition change candidates with the fewest failed cases are ranked higher, except for a condition change candidate having the highest rate of successes.

The manufacturing condition output unit 117 outputs a set value of a condition change of the top manufacturing condition candidate to the manufacturing facility, and additionally registers a new condition change in the condition change history.

Details of processes executed by each functional unit depicted in FIG. 2 are mentioned below.

The communication unit 140 is for the manufacturing condition setting automating apparatus 100 to communicate with manufacturing facilities 200 through the communication network 400. The communication unit 140 is equipment for performing communication conforming to the IEEE (The Institute of Electrical and Electronics Engineers, Inc.) 802.3 standard if the communication network 400 is a wired LAN, and is equipment for performing communication conforming to the IEEE802.11 standard if the communication network 400 is a wireless LAN. Examples of such equipment include a router, access point equipment, and the like.

For example, the communication unit 140 executes communication for storing, in the manufacturing condition setting automating apparatus 100, facility data acquired at manufacturing facilities 200. In addition, the communication unit 140 executes communication for transmitting manufacturing condition change candidate results to manufacturing facilities 200.

The storage unit 120 stores data, and programs. The storage unit 120 includes a magnetic storage medium such as a HDD (Hard Disk Drive), or a semiconductor storage medium such as a RAM (Random Access Memory), a ROM (Read Only Memory) or a SSD (Solid State Drive), for example. In addition, a combination of an optical disc such as a DVD (Digital Versatile Disk), and an optical disc drive also is used as the storage unit 120. Other than them, a known storage medium such as a magnetic tape medium also is used as the storage unit 120.

The storage unit 120 stores manufacturing management data 121, feature quantity settings 122, manufacturing condition settings 123, a condition change history 124, the facility data 125, manufacturing condition candidates 126, and imbalance-preventing candidate creation settings 127. Details of various types of data stored on the storage unit 120 are mentioned below.

Figures 3, 4:
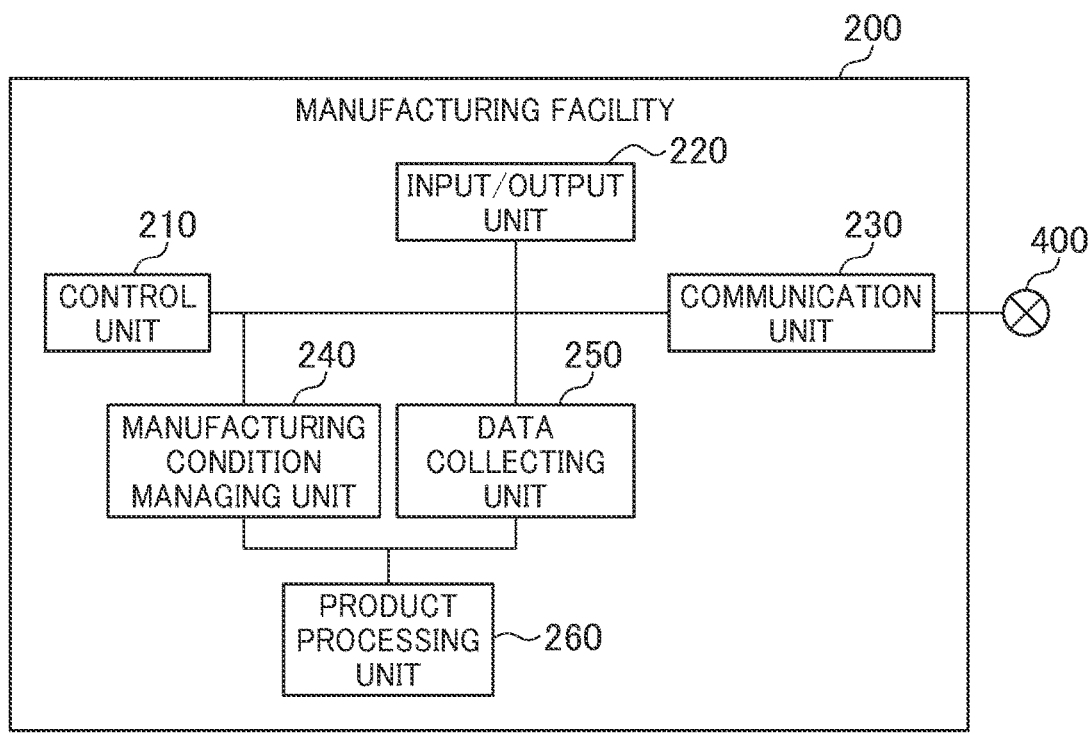
FIG. 3 is a configuration diagram depicting a manufacturing facility included in the manufacturing system according to the first embodiment.
FIG. 4 is a figure depicting one example of manufacturing management data in the first embodiment.

FIG. 3 is a configuration diagram depicting a manufacturing facility 200 included in the manufacturing system S according to the first embodiment.

If constituent elements of the manufacturing facility 200 are represented in expressions that can be applied commonly to typical manufacturing facilities, the manufacturing facility 200 has a control unit 210, an input/output unit 220, a communication unit 230, a manufacturing condition managing unit 240, a data collecting unit 250, and a product processing unit 260. Products (products to be subjected to processing) that are fed into the manufacturing facility 200 are processed in, and go out of the product processing unit 260.

The input/output unit 220 is an apparatus that receives input, and output from a user. For example, the input/output unit 220 is an apparatus that executes processes such as a process of receiving input of setting information to the control unit 210, a process of receiving input of initial values of manufacturing conditions managed by the manufacturing condition managing unit 240 or a process of receiving input of settings related to data collection to the data collecting unit 250.

The control unit 210 is an apparatus that controls the manufacturing facility 200. For example, the control unit 210 is an apparatus that executes processes such as a process of controlling the operation of the product processing unit in accordance with manufacturing conditions managed by the manufacturing condition managing unit 240 or a process of controlling the manufacturing facility 200 to stop at the time of the occurrence of an abnormality.

The communication unit 230 is an apparatus for the control unit 210, and the data collecting unit 250 to communicate with the manufacturing condition setting automating apparatus 100 through the network 400.

The manufacturing condition managing unit 240 manages manufacturing conditions used when processing is controlled at the product processing unit 260, and receives input of initial values of the manufacturing conditions from a user, and change settings of the manufacturing conditions by the manufacturing condition setting automating apparatus 100.

The data collecting unit 250 is an apparatus that collects facility data from various types of sensor installed at the product processing unit 260, and sends the facility data to the manufacturing condition setting automating apparatus 100 through the communication unit 230.

The product processing unit 260 is an apparatus that implements predetermined processing on products (products to be subjected to processing) fed into the manufacturing facility 200. For example, in a case that the manufacturing facility 200 is an automatic welding machine, the product processing unit 260 is a welding unit or a positioning unit, and in a case that the manufacturing facility 200 is an automatic assembling apparatus, the product processing unit 260 is a parts attaching unit or a soldering unit.

«Various Types of Data Stored on Storage Unit 120»

FIG. 4 is a figure depicting one example of the manufacturing management data 121 in the first embodiment. Creation, achievement collection, and management of the manufacturing management data 121 are performed at the manufacturing managing system 300 depicted in FIG. 1, and for example the manufacturing management data 121 has production plans, manufacturing target values, and manufacturing achievement values of a manufacturing line including a manufacturing facility 200. The manufacturing managing system 300 provides the latest manufacturing management data 121 in accordance with a request from the manufacturing condition setting automating apparatus 100.

The manufacturing management data 121 in the first embodiment stores manufacturing start times, scheduled manufacturing end times, manufacturing amount targets, yield targets, production speed targets, manufacturing amount achievements, yield achievements, and production speed achievements.

FIG. 5 is a figure depicting one example of a data table of the feature quantity settings 122 in the first embodiment. Each feature quantity is defined by a computation formula in terms of a use parameter which is facility data collected from a manufacturing facility 200.

For example, it is depicted that: a feature quantity 122a in the first line of the data table of the feature quantity settings 122 in FIG. 5 is a feature quantity of a type for judging "quality"; the feature quantity name is "quality Q"; the use parameter is "q"; the feature quantity 122a is a feature quantity defined by a computation formula, (USL−LSL)/6*Std(q), in terms of the facility data (q) that is collected as a sample over a period of ten minutes (where USL designates an upper limit standard value, LSL designates a lower limit standard value, Std(q) designates an estimated value of a population standard deviation, and the formula is for computing an index that quantitatively evaluates a process capability of a process); the designed lower limit value is 1.33; and the designed upper limit value is not determined clearly.

In addition, it is depicted that: a feature quantity 122b in the second line is a feature quantity of a type to be used when a past condition change history (training data) is searched to judge "similarity"; the feature quantity name is "feature quantity A"; the use parameter is "a"; the feature quantity 122b is a feature quantity defined by a computation formula, mean(a), in terms of the facility data (a) that is collected as a sample over a period of ten minutes; the designed lower limit value is 9; and the designed upper limit value is 18.

In addition, it is depicted that: a feature quantity 122c in the fifth line is a feature quantity of a type "settings" representing a set value of a manufacturing condition; the feature quantity name is "set value S"; the use parameter is "s"; and the computation formula is s itself. For example, the set value S is a set value of a voltage which is a manufacturing condition, and a plurality of set values S may be defined as other manufacturing conditions.

A plurality of data tables of the feature quantity settings 122 mentioned above may be defined for each manufacturing facility 200.

FIG. 6 is a figure depicting one example of a data table of manufacturing condition settings 123 in the first embodiment. Here, as manufacturing conditions in a case that a product A is manufactured in a manufacturing facility 200, the designed lower limit value of the set value S is defined as 1.9, and the designed upper limit value is defined as 2.9. In addition, the lower limit of the set value minimum unit is defined as 0.1, the upper limit is defined as 0.1, the lower limit of the set value change width ΔS is defined as −0.5, and the upper limit is defined as +0.5.

In addition, the score is a value representing a rate of successes computed in accordance with "(number of successful cases)/((number of successful cases)+(number of failed cases))" as an index for evaluating a result of a manufacturing condition change in the condition change history mentioned below.

In a case that there are plurality of set values S, data tables of the manufacturing condition settings 123 are defined separately. In addition, in a case that there is a plurality of manufacturing facilities 200, a data table of the manufacturing condition settings 123 is created for each manufacturing facility.

FIG. 7 is a figure depicting one example of a database of the condition change history 124 in the first embodiment. When a set value for changing a manufacturing condition is sent from the manufacturing condition setting automating apparatus 100 to a manufacturing facility 200, the condition change history 124 is registered newly as a past manufacturing condition change history, and the manufacturing condition, and each value before the change are recorded. When the condition change history 124 is searched thereafter, each value after the change, and information representing whether or not the change has been a success or failure is recorded.

The condition change history 124 stores a condition change history record including data items such as: times at which condition changes have been executed; change target manufacturing conditions; values of a manufacturing condition before the changes; values of the manufacturing condition after the changes; values of the quality Q before the changes; values of the quality Q after the changes; the feature quantity A before the changes; a feature quantity B before the changes; a feature quantity Q before the changes, . . . (other feature quantities), . . . , and information representing whether the condition changes have been successes or failures (in a case that the quality Q after a change has become higher than the quality Q before the change due to manufacturing condition change setting, it is evaluated as a successful case of a manufacturing condition change setting process, and in a case that the quality Q after a change has not become higher than the quality Q before the change due to manufacturing condition change setting, it is evaluated as a failed case of the manufacturing condition change setting process).

FIG. 8 is a figure depicting one example of a database of the facility data 125 in the first embodiment. The facility data 125 is collected from various types of sensor installed in the product processing unit 260 by the data collecting unit 250 of the manufacturing facility 200, is sent to the manufacturing condition setting automating apparatus 100 through the communication units 140, and 230, and the communication network 400, and is stored in the facility data 125 of the storage unit 120.

The facility data 125 stores times at which the facility data 125 is collected by the data collecting unit 250, and values such as parameters s, q, a, and b each of which is to be used for computing a feature quantity.

FIG. 9 is a figure depicting one example of a data table of the manufacturing condition candidate 126 which is a result of a process, performed by the manufacturing condition candidate creating unit 114, of creating candidates of changes to be made to a manufacturing condition in the first embodiment. The data table of the manufacturing condition candidate 126 stores Ranks representing ranks starting from 1 in descending order of rates of successes, values of the set value S after condition changes, the numbers of successful cases, the numbers of failed cases, rates of successes (scores), average values of the quality Q of successful cases after the condition changes.

FIG. 10 is a figure depicting one example of a data table of the manufacturing condition candidate 126 after having been subjected to a process at the imbalance-preventing manufacturing condition candidate creating unit 116 by using as input the manufacturing condition candidates depicted in FIG. 9.

FIG. 11 is a figure depicting one example of the imbalance-preventing candidate creation settings 127 to be referred to at the process performed by the imbalance-preventing manufacturing condition candidate creating unit 116 in the first embodiment. The maximum number of candidates is defined in the imbalance-preventing candidate creation settings 127 as a set value 5.

«Operation of Manufacturing Condition Setting Unit 112 of Manufacturing Condition Setting Automating Apparatus 100»

Hereinafter, with reference to flowcharts in FIG. 12 to FIG. 16, and FIG. 17, and FIG. 18, the operation of the manufacturing condition setting unit 112 of the manufacturing condition setting automating apparatus 100 in the first embodiment is explained. Note that it is assumed in the following explanation that the facility data acquiring unit of the manufacturing condition setting automating apparatus 100 always collects facility data from manufacturing facilities 200 while the manufacturing facilities 200 are activate, and repetitively executes the operation of storing the facility data in the facility data 125 of the storage unit 120.

FIG. 12 is a flowchart depicting the operation of the manufacturing condition setting unit 112 of the manufacturing condition setting automating apparatus 100 in the first embodiment. The manufacturing condition setting unit 112 is activated at predetermined time intervals for a manufacturing facility 200, and executes a series of processes.

At Step S100, the quality judging unit 113 judges quality on the basis of the latest facility data of the manufacturing facility 200.

At Step S200, if the result of the quality judgment represents that the quality is OK, a manufacturing condition setting process is not executed, but the series of processes ends. If the result of the quality judgment represents that the quality is NG, the series of processes proceeds to S300.

At Step S300, the manufacturing condition candidate creating unit 114 executes a manufacturing condition candidate creation process.

At Step S400, the long-term KPI judging unit 115 executes a long-term KPI judgment process.

At Step S500, if the result of the long-term KPI judgment represents that the long-term KPI is OK, the series of processes proceeds to S600, and if the result of the long-term KPI judgment represents that the long-term KPI is NG, the series of processes proceeds to S700.

At Step S600, the imbalance-preventing manufacturing condition candidate creating unit 116 executes an imbalance-preventing manufacturing condition candidate creation process.

At Step S700, the manufacturing condition output unit 117 outputs, to the manufacturing facility, a set value of a condition change of Rank=1 in manufacturing condition candidates, additionally registers the set value of the condition change as a past manufacturing condition change history in the condition change history 124, and ends the process.

Figure 13:
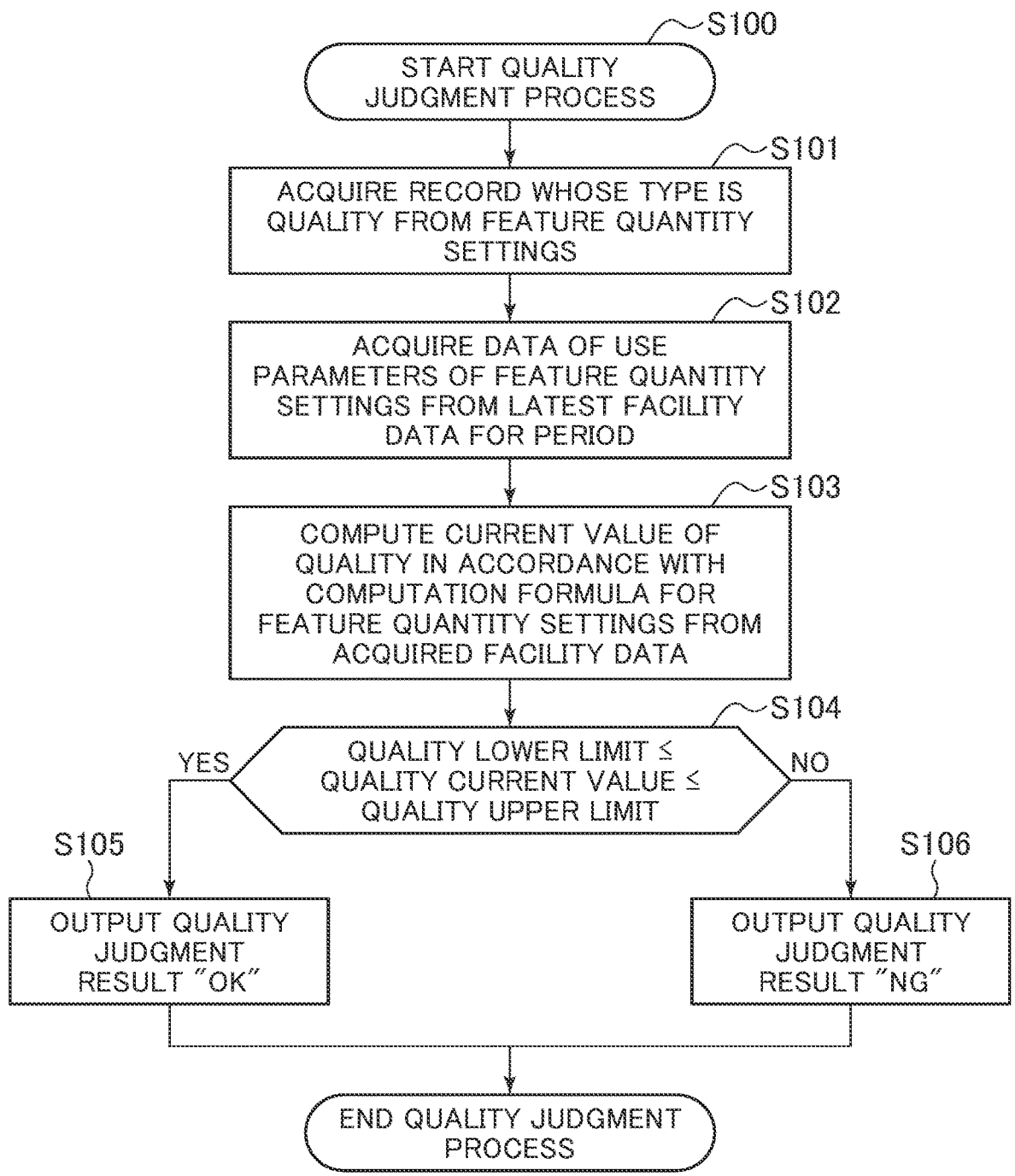
FIG. 13 is one example of a flowchart depicting a quality judgment process performed by a quality judging unit in the first embodiment.

FIG. 13 is one example of a flowchart of the quality judgment process S100 performed by the quality judging unit 113.

At Step S101, a record whose type is quality is acquired from the feature quantity settings 122.

At Step S102, the latest data of the use parameter (q) of feature quantity (quality Q) settings of a period (ten minutes in the example depicted in FIG. 5) is acquired from the facility data 125.

At Step S103, the current value of the quality is computed from the acquired facility data in accordance with a feature quantity settings computation formula {e.g. (USL−LSL)/ 6*Std(q) depicted in FIG. 5}.

At Step S104, it is judged whether or not a discriminant ((quality lower limit)≤(current value of quality)≤(quality upper limit)) is satisfied. If the discriminant is satisfied, the series of processes proceeds to S105, and if not satisfied, the series of processes proceeds to S106.

At Step S105, a quality judgment result "OK" is output, and the series of processes is ended, and at Step S106, a quality judgment result "NG" is output, and the series of processes is ended.

Figure 14:
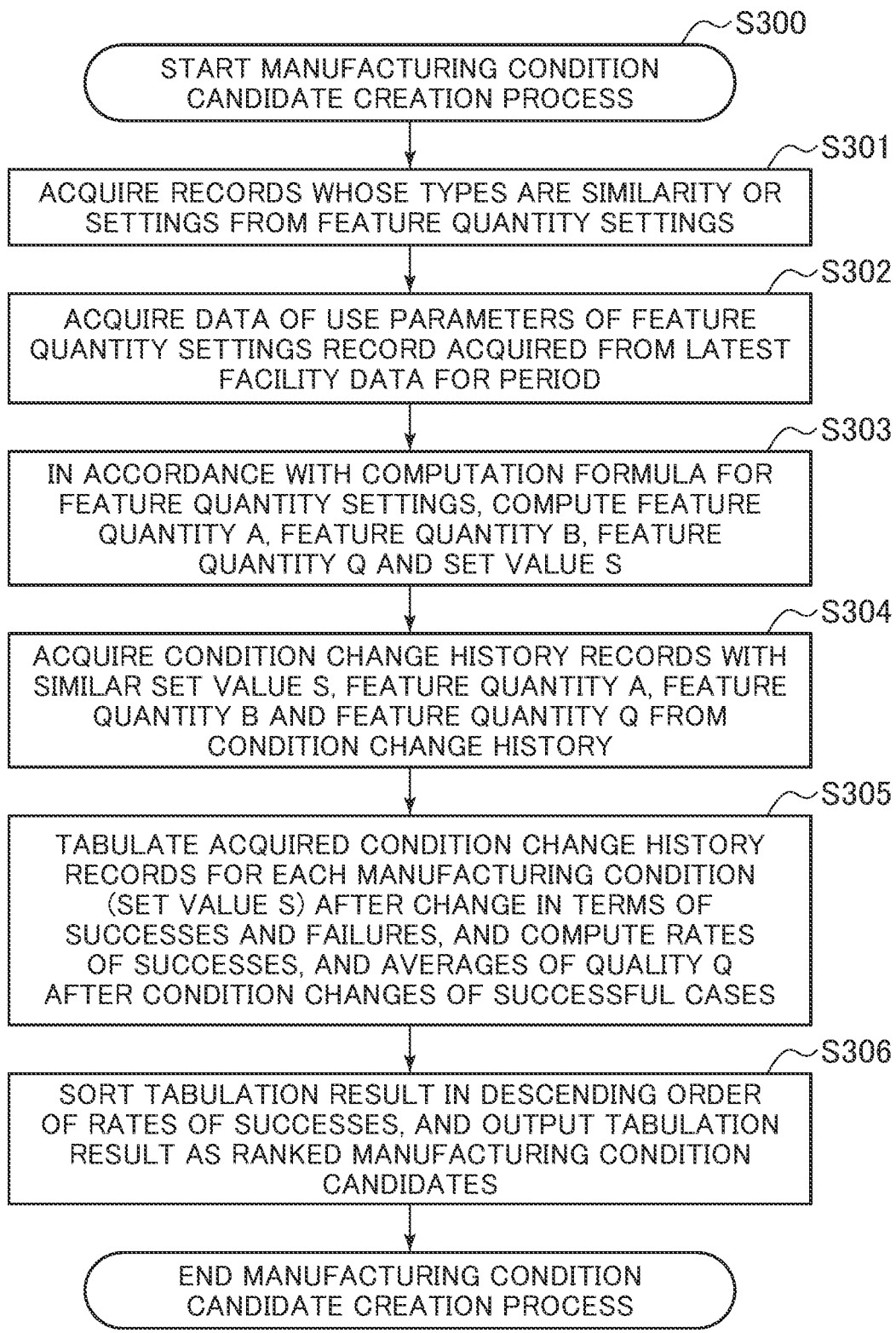
FIG. 14 is one example of a flowchart depicting a manufacturing condition candidate creation process performed by the manufacturing condition candidate creating unit in the first embodiment.

FIG. 14 is one example of a flowchart depicting the manufacturing condition candidate creation process S300 performed by the manufacturing condition candidate creating unit 114.

At Step S301, each record whose type is similarity or settings is acquired from the feature quantity settings 122.

At Step S302, the latest data of each use parameter (a, b, q, and s in the example depicted in FIG. 5) of each feature quantity (the feature quantity A, the feature quantity B, the feature quantity Q, and the set value S in the example depicted in FIG. 5) setting for a period (ten minutes for a, b, and q, and the latest one for s in the example depicted in FIG. 5) is acquired from the facility data 125.

At Step S303, in accordance with each computation formula of feature quantity settings, each feature quantity (the feature quantity A, the feature quantity B, the feature quantity Q, and the set value S) is computed from the acquired facility data.

At Step S304, each feature quantity (the set value S, the feature quantity A, the feature quantity B, and the feature quantity Q) computed at S303 is used as a search key to perform a search to know whether or not the feature quantity matches a corresponding one of the manufacturing condition after a change, the feature quantity A before the change, the feature quantity B before the change, and the feature quantity Q before the change of each condition change history record registered in the condition change history 124 with an error which is within an error range from a separately specified threshold. Then, condition change history records with feature quantities all of which match (are similar to) the feature quantities acquired at S303 with errors within the error ranges are acquired.

At Step S305, for condition change history records whose fields of the quality Q after changes and fields which represent whether or not the changes have been successes or failures are blank in the similar condition change history records acquired at S304, facility data whose times corresponds to the records is read out, the quality Q after the changes are computed, and written in. Then, in a case that the quality Q after a change has become higher than the quality Q before the change due to manufacturing condition change setting, it is evaluated as a successful case of the manufacturing condition change setting process, and in a case that the quality Q after a change has not become higher than the quality Q before the change due to manufacturing condition change setting, it is evaluated as a failed case of the manufacturing condition change setting process. o or x is recorded success or failure fields.

Then, all the similar condition change history records acquired at S304 are tabulated in terms of successes or failures for each manufacturing condition (set value S) after changes, the number of successful cases, and the number of failed cases are computed, and (rate of successes)=(number of successful cases)/((number of successful cases)+(number of failed cases)), and the successful case average of the quality Q after the condition changes are computed.

At Step S306, the result of tabulation for each manufacturing condition (set value S) after the changes at S305 is sorted in descending order of rates of successes, is given Ranks, and is stored in the manufacturing condition candidates 126.

Figure 15:
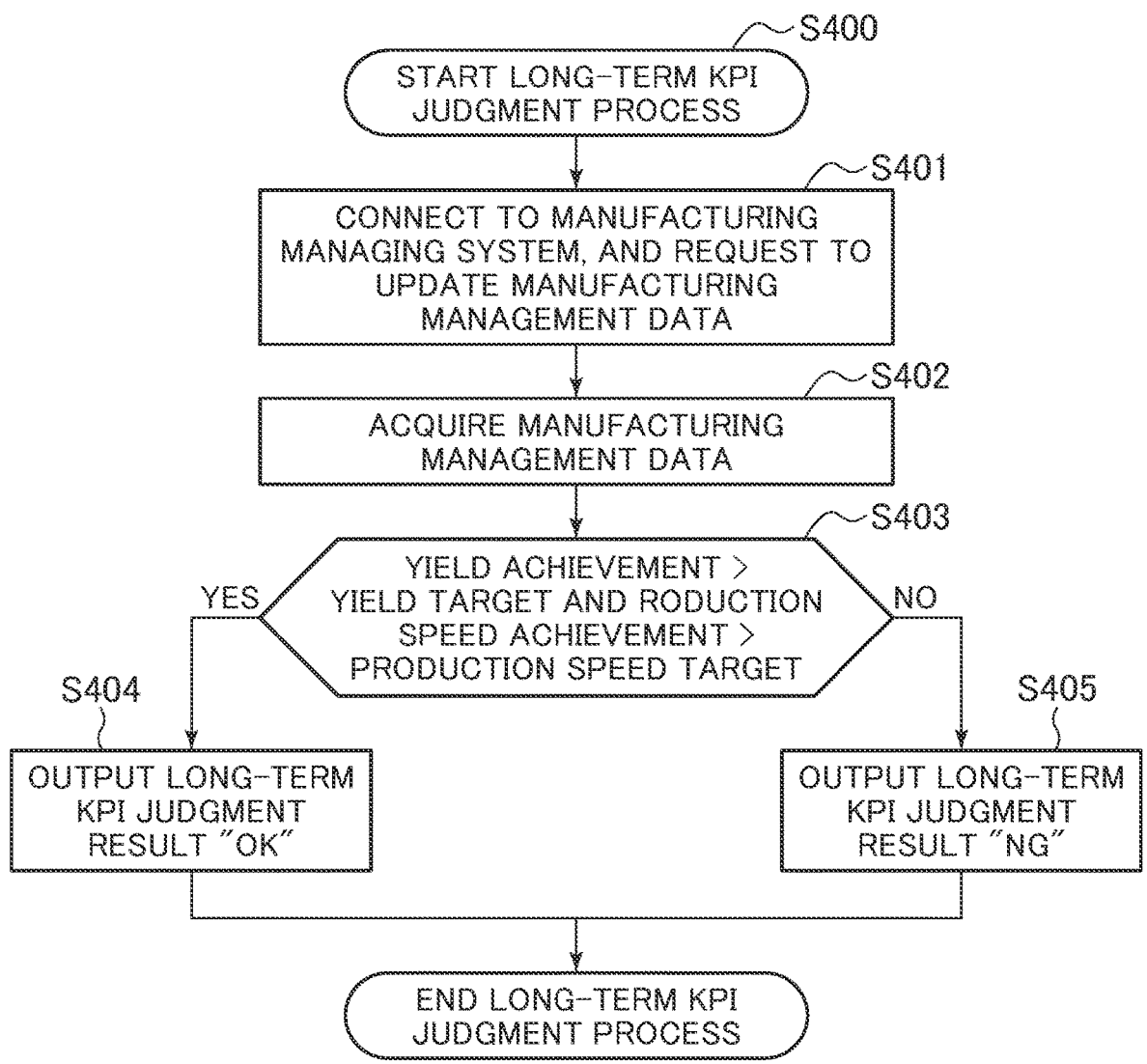
FIG. 15 is one example of a flowchart depicting a long-term KPI judgment process performed by a long-term KPI judging unit in the first embodiment.

FIG. 15 is one example of a flowchart of the long-term KPI judgment process S400 performed by the long-term KPI judging unit 115.

At Step S401, the manufacturing managing system 300 is requested to update the manufacturing management data.

At Step S402, the latest manufacturing management data is acquired from the manufacturing managing system 300, and is stored in the manufacturing management data 121 of the storage unit 120.

At Step S403, it is judged whether or not the latest manufacturing management data satisfies the judgment condition ((yield achievement)>(yield target), and (production speed achievement)>(production speed target)). If the judgment condition is satisfied, the series of process proceeds to S404, and if not satisfied, the series of processes proceeds to S405.

At Step S404, a long-term KPI judgment result "OK" is output, and the series of processes is ended, and at Step S405, a long-term KPI judgment result "NG" is output, and the series of processes is ended.

Figure 16:
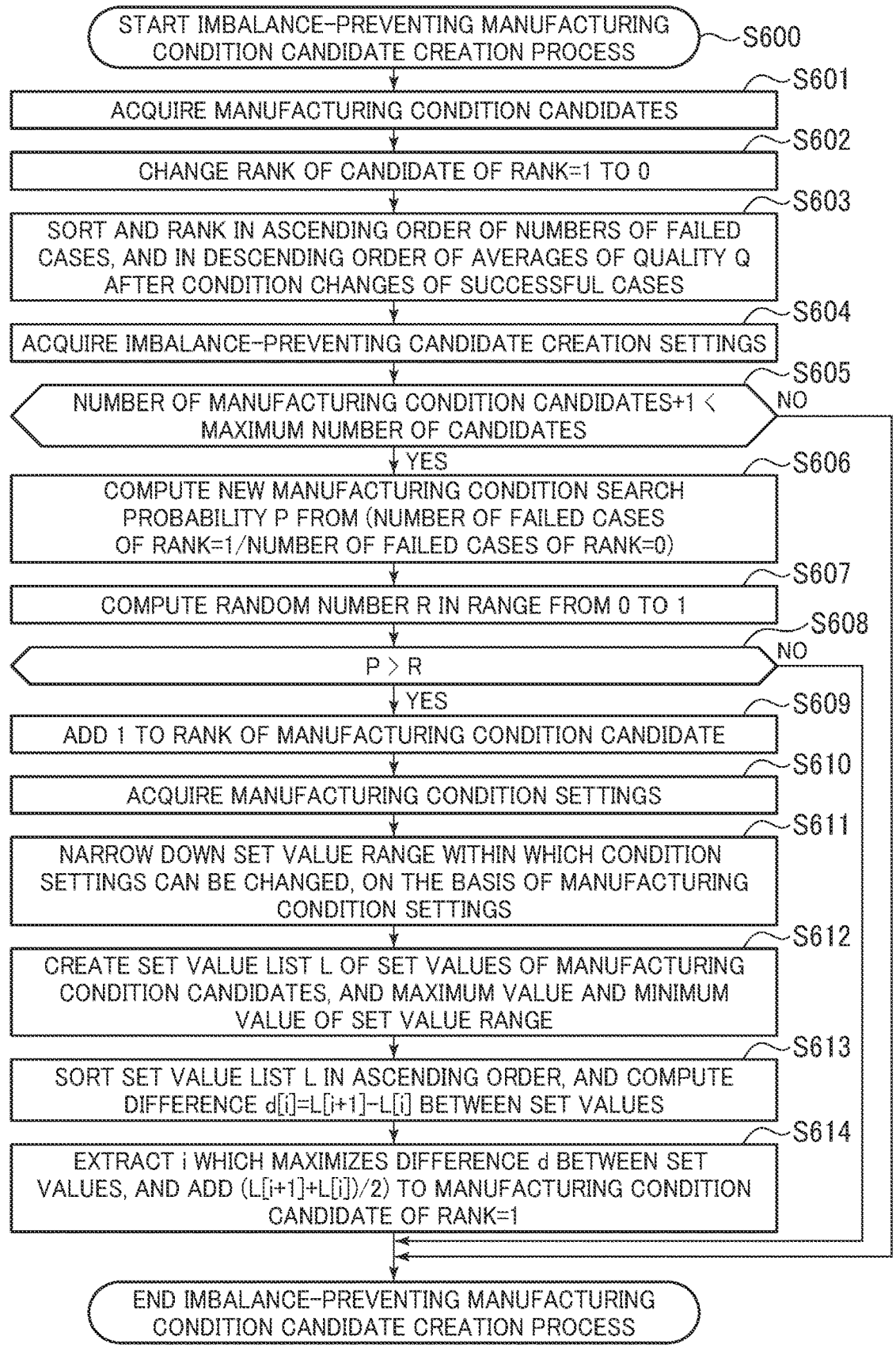
FIG. 16 is one example of a flowchart depicting an imbalance-preventing manufacturing condition candidate creation process performed by the imbalance-preventing manufacturing condition candidate creating unit in the first embodiment.

FIG. 16 is one example of a flowchart of the imbalance-preventing manufacturing condition candidate creation process S600 performed by the imbalance-preventing manufacturing condition candidate creating unit 116.

At Step S601, manufacturing condition candidates 126 created at S300 (one example of which is depicted in FIG. 9) are acquired.

At Step S602, the rank of a candidate with Rank=1 in the acquired data table of the manufacturing condition candidates is changed to 0, and excluded from the candidates.

At Step S603, using as targets the remaining candidates from which the candidate which really is Rank=1 is excluded at S602, the remaining candidates are sorted in ascending order of numbers of failed cases, and descending order of successful case averages of the quality Q after condition changes, and reranked, to create manufacturing condition candidates, one example of which is depicted in FIG. 10. The manufacturing condition candidate to be given Rank=1 at this time becomes a set value depicted as 116b in FIG. 17.

At Step S604, data of the imbalance-preventing candidate creation settings 127 is acquired.

At Step S605, it is judged whether or not the discriminant {(number of manufacturing condition candidates)+1<(maximum number of candidates)} is satisfied. If the discriminant is satisfied, the series of processes proceeds to S606, and if not satisfied, the series of processes is ended.

At Step S606, a new manufacturing condition search probability P is computed in accordance with (new manufacturing condition search probability P)=(number of failed cases of Rank=1)/(number of failed cases of Rank=0).

At Step S607, a random number R within the range from 0 to 1 is computed.

At Step S608, it is judged whether or not the discriminant {(new manufacturing condition search probability P)>(random number R)} is satisfied. If YES, the series of processes proceeds to S609, and if NO, the series of processes is ended.

At Step S609, 1 is added to Rank of each candidate stored in the manufacturing condition candidates 126, and the record field of the candidate of Rank=1 is made blank.

At Step S610, the data of the data table of the manufacturing condition settings 123 is acquired.

Figure 17:
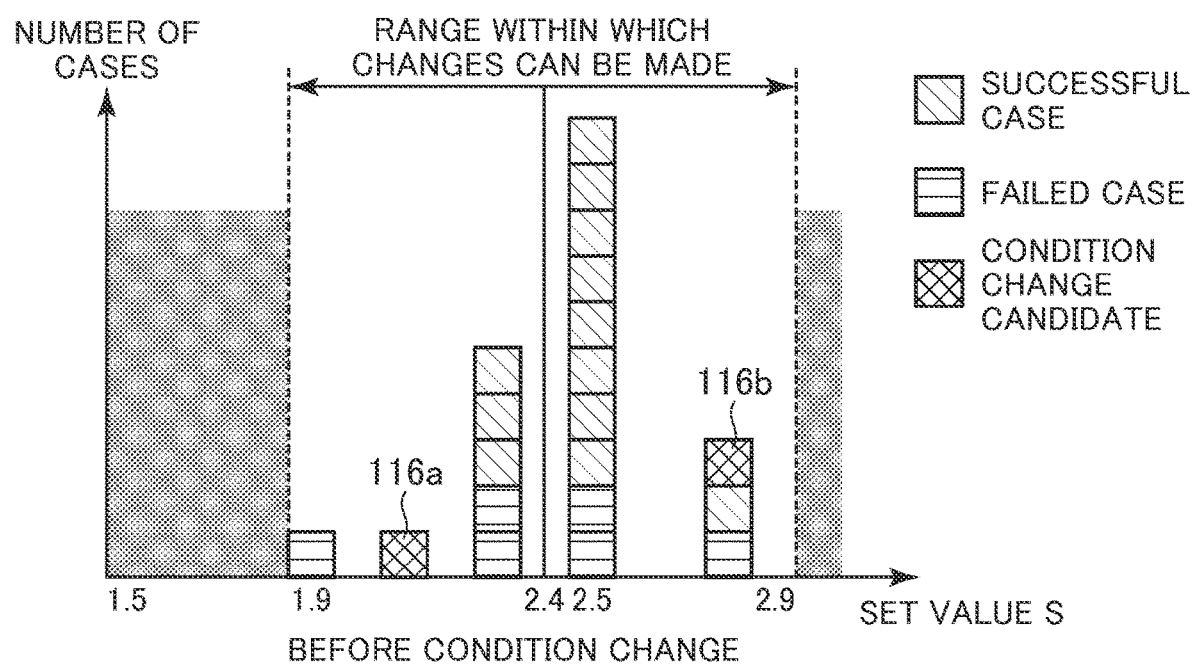
FIG. 17 is a figure depicting an example of selection of condition change candidates such that the condition change candidates are within a set value range within which manufacturing condition change setting is possible, in the imbalance-preventing manufacturing condition candidate creation process in the first embodiment.

At Step S611, on the basis of the data of the manufacturing condition settings 123, the set value range within which the manufacturing condition change setting is possible is narrowed down as depicted in FIG. 17.

At Step S612, a set value list L of the manufacturing condition candidates 126, and the maximum value, and minimum value of the set value range is created.

At Step S613, the set value list L is sorted in ascending order, and a difference $d[i]=L[i+1]-L[i]$ of adjacent set values is computed.

At Step S164, i which maximizes the difference d between set values is extracted, the set value of $(L[i+1]+L[i])/2$ is added to the manufacturing condition candidate 126 of Rank=1. The manufacturing condition candidate to be Rank=1 at this time is a set value depicted as 116a in FIG. 17.

Figure 18:
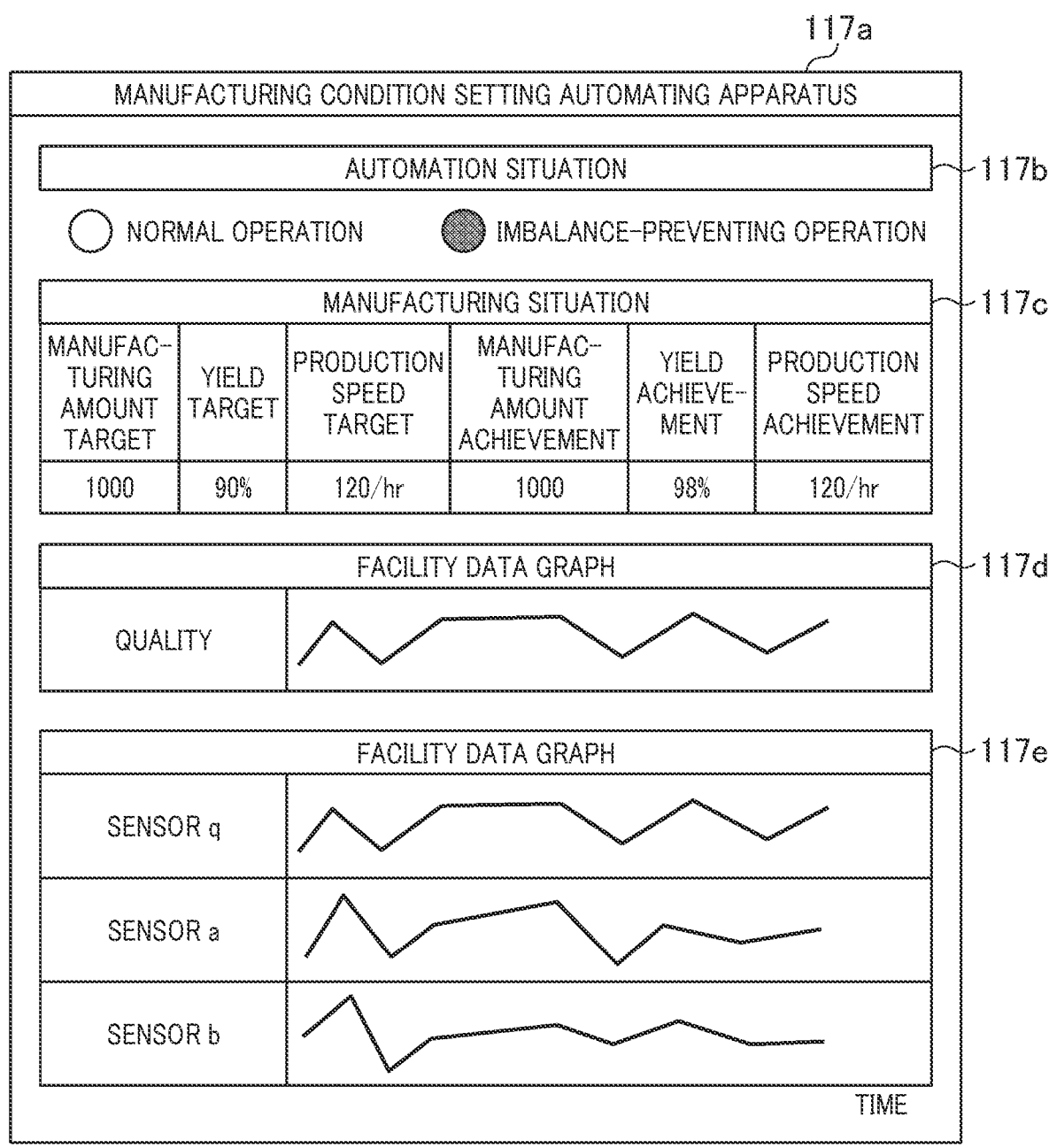
FIG. 18 is a figure depicting one example in which a manufacturing condition output unit in the first embodiment displays, on a screen, a situation of the manufacturing condition setting process.

FIG. 18 depicts an example in which the manufacturing condition output unit 117 displays, on a screen, a situation of the manufacturing condition setting process performed by the input/output unit 130 at Step S700. A display screen 117a has: an automation situation display field 117b that displays, in an identifiable manner, whether the operation is normal operation or imbalance-preventing operation; a manufacturing situation display field 117c that displays the manufacturing management data 121; and facility data graph display fields 117d, and 117e that display graphs of the transitions of facility data of use parameters on the basis of which each feature quantity is computed.

Second Embodiment

In the configuration diagram depicted in FIG. 2, instead of the processes executed by the imbalance-preventing manufacturing condition candidate creating unit 116 in the first embodiment, processes are executed by the failure data classifying unit 118 of the control unit 110 in the manufacturing condition setting automating apparatus 100 in a second embodiment.

Figure 19:
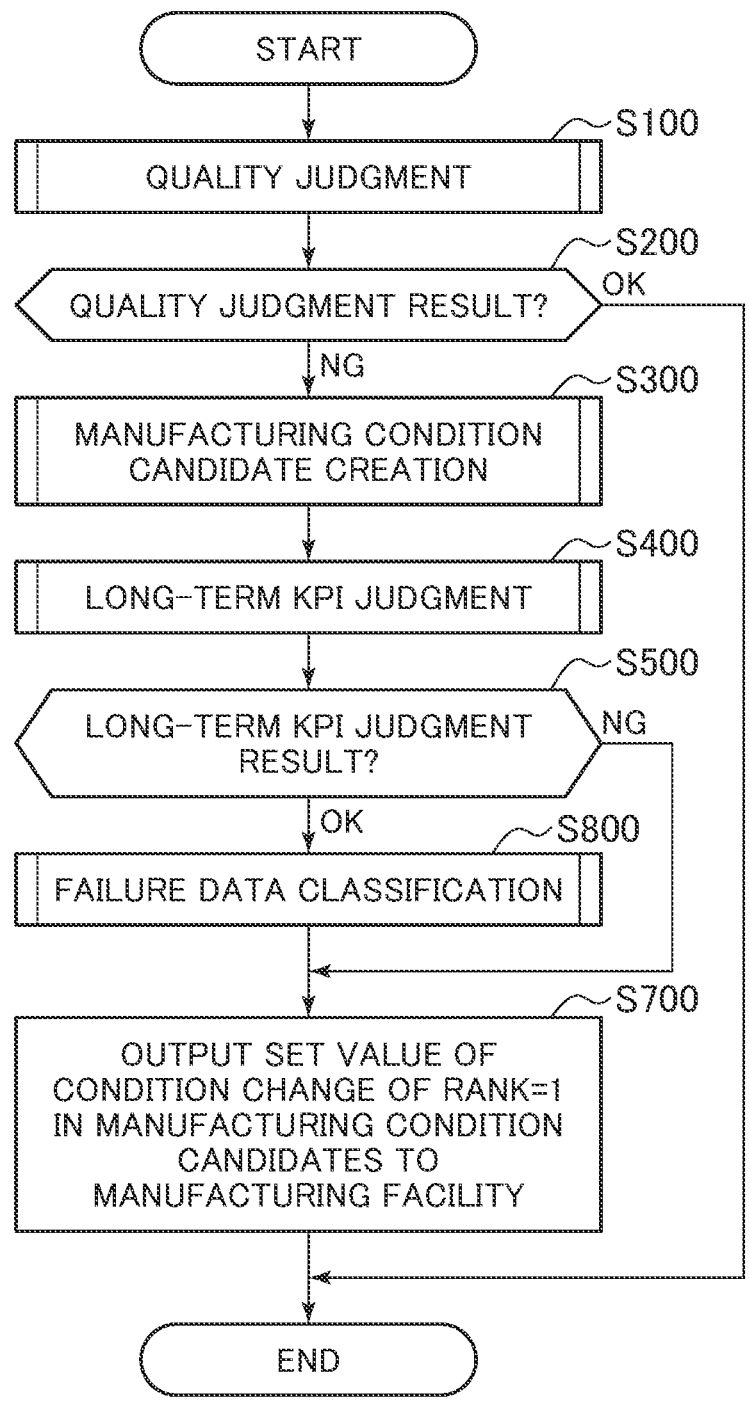
FIG. 19 is one example of a flowchart depicting the manufacturing condition setting process performed by the manufacturing condition setting unit of the manufacturing condition setting automating apparatus in a second embodiment.

FIG. 19 depicts a flowchart depicting the operation of the manufacturing condition setting unit 112 of the manufacturing condition setting automating apparatus 100 in the second embodiment. In this flowchart, the imbalance-preventing manufacturing condition candidate creation process S600 in the flowchart of the operation of the manufacturing condition setting unit 112 in the first embodiment depicted in FIG. 12 is replaced with a failure data classification process S800.

Figure 20:
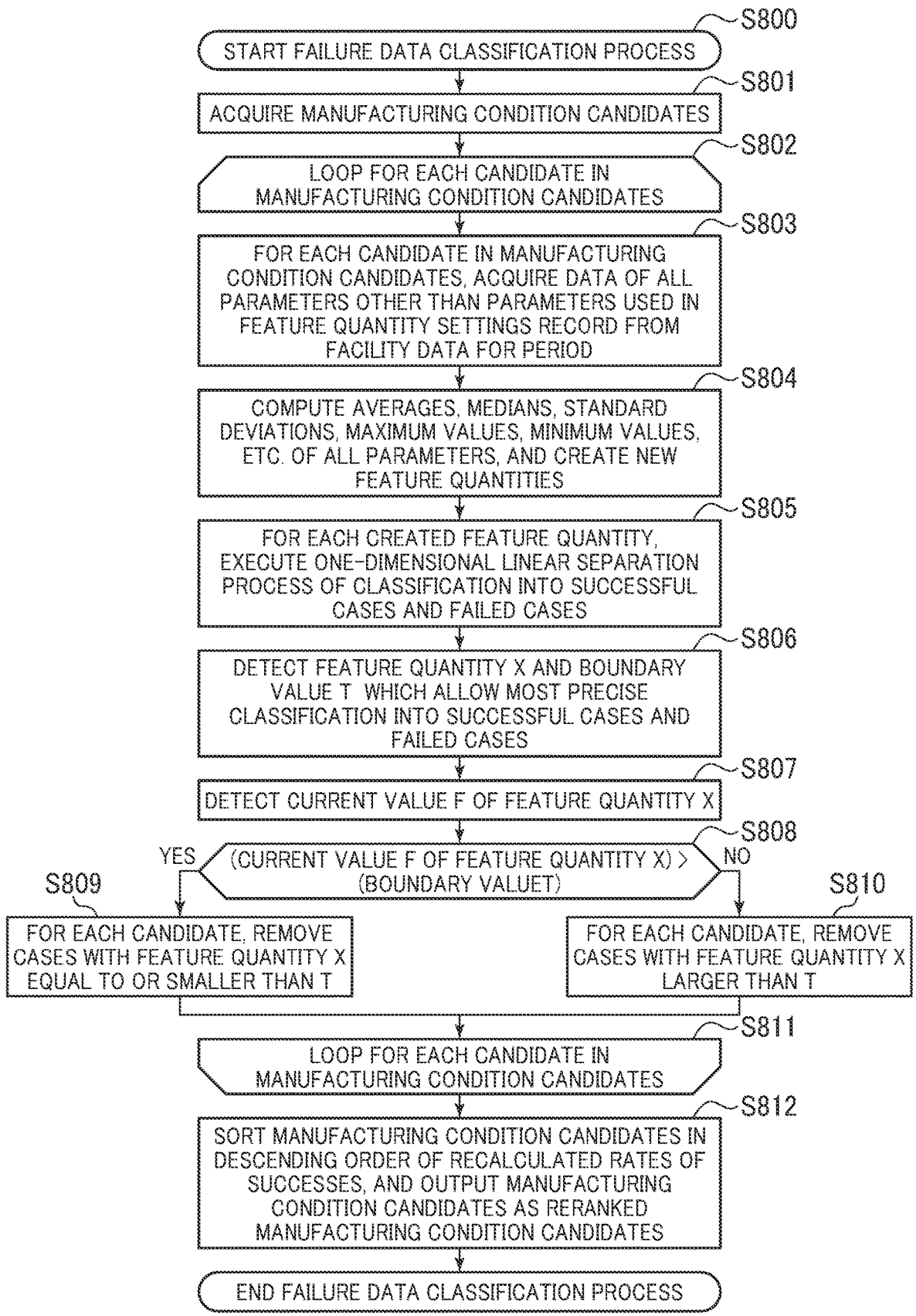
FIG. 20 is one example of a flowchart depicting a failure data classification process performed by a failure data classifying unit in the second embodiment.

FIG. 20 is one example of a flowchart of the failure data classification process S800 performed by the failure data classifying unit 118.

At Step S801, manufacturing condition candidates 126 created at S300 (one example of which is depicted in FIG. 9) are acquired.

At Step S802, a loop process up to S811 is executed for each candidate in the manufacturing condition candidates 126.

At Step S803, for each candidate in the manufacturing condition candidates 126, data of all parameters other than the parameters used in data records in the feature quantity settings 122 is acquired for a predetermined period from the facility data 125.

At Step S804, the averages, medians, standard deviations, maximum values, and minimum values of all the parameters acquired at S803 are computed to create new feature quantities.

At Step S805, for each feature quantity created at S804, a one-dimensional linear separation process to classify cases into successful cases, and failed cases is executed.

At Step S806, on the basis of the result of the process on each feature quantity at S805, a feature quantity X, and a boundary value T that allow most precise classification into successful cases, and failed cases are detected.

At Step S807, a current value F of the feature quantity X is detected.

At Step S808, it is judged whether the discriminant {(current value F of feature quantity X)>(boundary value T)} is satisfied. If YES, the series of processes proceeds to S809, and if NO, the series of processes proceeds to S810.

At Step S809, for each candidate in the manufacturing condition candidates 126, cases with values of the feature quantity X which are equal to or smaller than the boundary value T are removed.

At Step S810, for each candidate in the manufacturing condition candidates 126, cases with values of the feature quantity X which are larger than the boundary value T are removed.

At Step S811, a loop process from S802 to S811 is executed for each candidate in the manufacturing condition candidates 126.

At Step S812, the manufacturing condition candidates 126 are sorted in descending order of recalculated rates of successes, and are output as reranked manufacturing condition candidates 126.

What is claimed is:

1. A system for controlling a plurality of machines in a manufacturing facility based on at least one key performance indicator (KPI), the system comprising:
  a memory that stores a database;
  a communication interface; and
  a processor that is communicatively coupled to the memory and the communication interface, wherein the processor is configured to:
  constantly receive, using the communication interface, a plurality of pieces of facility data from the manufacturing facility, wherein the plurality of pieces of the facility data include information relating to the plurality of machines;
  records the plurality of pieces of the facility data in the database;
  computes a present process capability from the facility data at predetermined time intervals,
  judges whether or not the present process capability is in a quality tolerance range;
  in a case that the present process capability is judged as being not in the quality tolerance range;
    computes a feature quantity to be used for a similarity judgment from the facility data,
    searches the database for a past condition change history for condition change cases having matching feature quantities to generate search results;
    tabulates condition change cases found in the search results on a basis of whether the condition change cases are successes or failures, and
    outputs manufacturing condition candidates in descending order of rates of successes,
  calculates a KPI based on historical data that is stored in the database,
  in a case that the KPI is judged as being higher than a target value:
    changes scores that decide ranks of manufacturing condition candidates, and
    creates manufacturing condition candidates in which condition change candidates with fewer failed cases are ranked higher, except for a condition change candidate having a highest rate of successes;
  controls, using the communication interface, the plurality of machines in the manufacturing facility in accordance with a top manufacturing condition candidate selected from the manufacturing condition candidates created, and
  registers a new condition change in the database.

2. The system according to claim 1, wherein the processor is further configured to:
  search the database of the past condition change history for specific condition change cases having feature quantities that match within error ranges from thresholds each specified for a similarity-judgment feature quantity.

3. The system according to claim 1, wherein the processor is further configured to:
- evaluate acquired similar condition change cases as successful cases if the cases have made quality after condition changes higher than quality before the condition changes, and as failed cases if the cases have not made quality after condition changes higher than quality before the condition changes,
- tabulate a numbers of successful cases, and failed cases for each condition change candidate, and outputs manufacturing condition candidates in which condition change candidates are arranged in descending order of rates of successes.

4. The system according to claim 1, wherein a yield achievement, and production speed achievement of each lot recorded in manufacturing management data is adopted as the KPI.

5. The system according to claim 1, wherein the processor is further configured to:
- on a basis of a ratio between a number of failed cases of a condition change candidate having a highest rate of successes, and a minimum value of the numbers of failed cases in manufacturing condition candidates, output a condition changes other than the condition change candidates into the manufacturing condition candidates calculated.

6. The system according to claim 1, wherein the processor is further configured to:
- in a case that the KPI is judged as being higher than the target value, creates a new feature quantity not used in a similarity search from the facility data for each candidate of manufacturing condition candidates:
- detect a feature quantity X, and boundary value that allow most precise classification into successful cases, and failed cases,
- filter cases included in each candidate on a basis of a comparison between a current value of the feature quantity X, and the boundary value,
- sort remaining manufacturing condition candidates in descending order of recalculated rates of successes, and
- output reranked manufacturing condition candidates that are utilized to control the plurality of machines.

7. A non-transitory computer readable storage medium storing instructions for controlling a plurality of machines in a manufacturing facility based on at least one key performance indicator (KPI), the instructions when executed by a processor cause the processor to execute a method, the method comprising:
- constantly receiving, using a communication interface, a plurality of pieces of facility data from the manufacturing facility, wherein the plurality of pieces of the facility data include information relating to the plurality of machines;
- recording the plurality of pieces of the facility data in a database;
- computing a present process capability from the facility data at predetermined time intervals;
- judging whether or not the present process capability is in a quality tolerance range;
- in a case that the present process capability is judged as being not in the quality tolerance range:
  - computing a feature quantity to be used for a similarity judgment from latest facility data,
  - searching the database for a past condition change history for condition change cases having similar matching to generate search results,
  - tabulating condition change cases found in the search results on a basis of whether the condition change cases are successes or failures, and
  - outputting manufacturing condition candidates in descending order of rates of successes;
- calculating a KPI based on historical data that is stored in the database;
- in a case that the KPI is judged as being higher than a target value:
  - changing scores that decide ranks of manufacturing condition candidates, and
  - creating manufacturing condition candidates in which condition change candidates with fewer failed cases are ranked higher, except for a condition change candidate having a highest rate of successes;
- controlling, using the communication interface, the plurality of machines in the manufacturing facility in accordance with a top manufacturing condition candidate to the manufacturing facility; and
- registering a new condition change in the database.

8. The non-transitory computer readable storage medium to claim 7, wherein the method further includes in a case that the present process capability is judged as being not in the quality tolerance range:
- computing a feature quantity to be used for a similarity judgment from latest facility data, searching the database of the past condition change history for condition change cases having feature quantities that match within error ranges from thresholds each specified for a similarity-judgment feature quantity,
- evaluating acquired similar condition change cases as successful cases if the cases have made quality after condition changes higher than quality before the condition changes, and as failed cases if the cases have not made quality after condition changes higher than quality before the condition changes, tabulating a number of successful cases, and failed cases for each condition change candidate, and
- outputting manufacturing condition candidates in which condition change candidates are arranged in descending order of rates of successes.

9. The non-transitory computer readable storage medium according to claim 7, wherein the method further includes:
- creating manufacturing condition candidates in which condition change candidates with fewer failed cases are ranked higher, except for a condition change candidate having a highest rate of successes is, on a basis of a ratio between a number of failed cases of a condition change candidate having a highest rate of successes, and a minimum value of a number of failed cases in manufacturing condition candidates, and
- outputting condition changes other than the condition change candidates into the manufacturing condition candidates.

10. The non-transitory computer readable storage medium according to claim 7, wherein the method further: in a case that the KPI is judged as being higher than the target value;
- creates a new feature quantity not used in a similarity search from facility data for each candidate of manufacturing condition candidates,
- detects a feature quantity X, and boundary value that allow most precise classification into successful cases, and failed cases,
- filters cases included in each candidate on a basis of a comparison between a current value of the feature quantity X, and the boundary value, sorts remaining manufacturing condition candidates in descending order of recalculated rates of successes, and outputs reranked manufacturing condition candidates that are utilized to control the plurality of machines.

* * * * *